United States Patent [19]

O'Neal

[11] 4,277,878

[45] Jul. 14, 1981

[54] METHOD OF MAKING WIRE-BOUND SHIPPING CARTON

[75] Inventor: James E. O'Neal, Pompano Beach, Fla.

[73] Assignee: Vernon E. Ramsey, Inc., Boca Raton, Fla.

[21] Appl. No.: 96,195

[22] Filed: Nov. 20, 1979

Related U.S. Application Data

[62] Division of Ser. No. 28,700, Apr. 10, 1979, abandoned.

[51] Int. Cl.[3] .......... B23P 11/00

[52] U.S. Cl. .......... 29/432; 29/505; 217/12 A; 217/42; 217/43 R; 217/51; 229/23 C

[58] Field of Search .......... 29/432, 505; 229/23 C, 229/23 R; 217/42, 43 R, 51, 12 A, 68

[56] References Cited

U.S. PATENT DOCUMENTS

| | | | |
|---|---|---|---|
| 927,265 | 7/1909 | Mengel | 29/432 UX |
| 1,119,208 | 12/1914 | Weiss | 229/23 R X |
| 1,471,113 | 10/1923 | Ewell | 29/432 X |
| 1,743,702 | 1/1930 | Boeye | 229/23 R X |
| 1,917,920 | 7/1933 | Bliss | 29/432 |
| 2,021,234 | 11/1935 | Gomes | 229/23 R X |
| 2,022,538 | 11/1935 | Colbie | 217/12 A |
| 2,030,069 | 2/1936 | Miller | 217/12 A |
| 2,115,635 | 4/1938 | Kruse | 29/432 |
| 2,862,206 | 12/1958 | Bell | 29/432 |
| 2,975,926 | 3/1961 | Royce | 229/23 C UX |

*Primary Examiner*—Charlie T. Moon

*Attorney, Agent, or Firm*—Berman, Aisenberg & Platt

[57] ABSTRACT

A ventilated shipping carton formed of a pair of identical, fibreboard, top and bottom closures each having a four sided vertical rim and a plurality of flaps secured to opposite sides of the rim and movable from an overlapping closed position to an unfolded, spread position for opening the carton, a plurality of wood veneer slats arranged vertically between the rims of the closures, and spaced apart for ventilation to form four sides of the rectangular carton body, and a plurality of spaced, horizontal binding wires wound about and embracing the rims of the top and bottom closures and secured to the closure rims and the ends of the slats. The invention further contemplates the method of making the carton as inclusive of the following steps:

1. forming each closure from a planar fibreboard blank by slitting and scoring to define the rim and flap portions;
2. arranging the slats in spaced parallel relation in one plane;
3. placing the closure blanks spread apart with the flaps facing outwardly from one another and the rims overlying and touching the ends of the slats,
4. placing a wire along each rim and overlying the rim and the underlying slat ends; and
5. stapling the wires to the adjacent rims and underlying slat ends, whereby completing a carton in flat condition and which may be folded into a box-like structure for loading with fruit or other produce.

4 Claims, 8 Drawing Figures

FIG. 4.
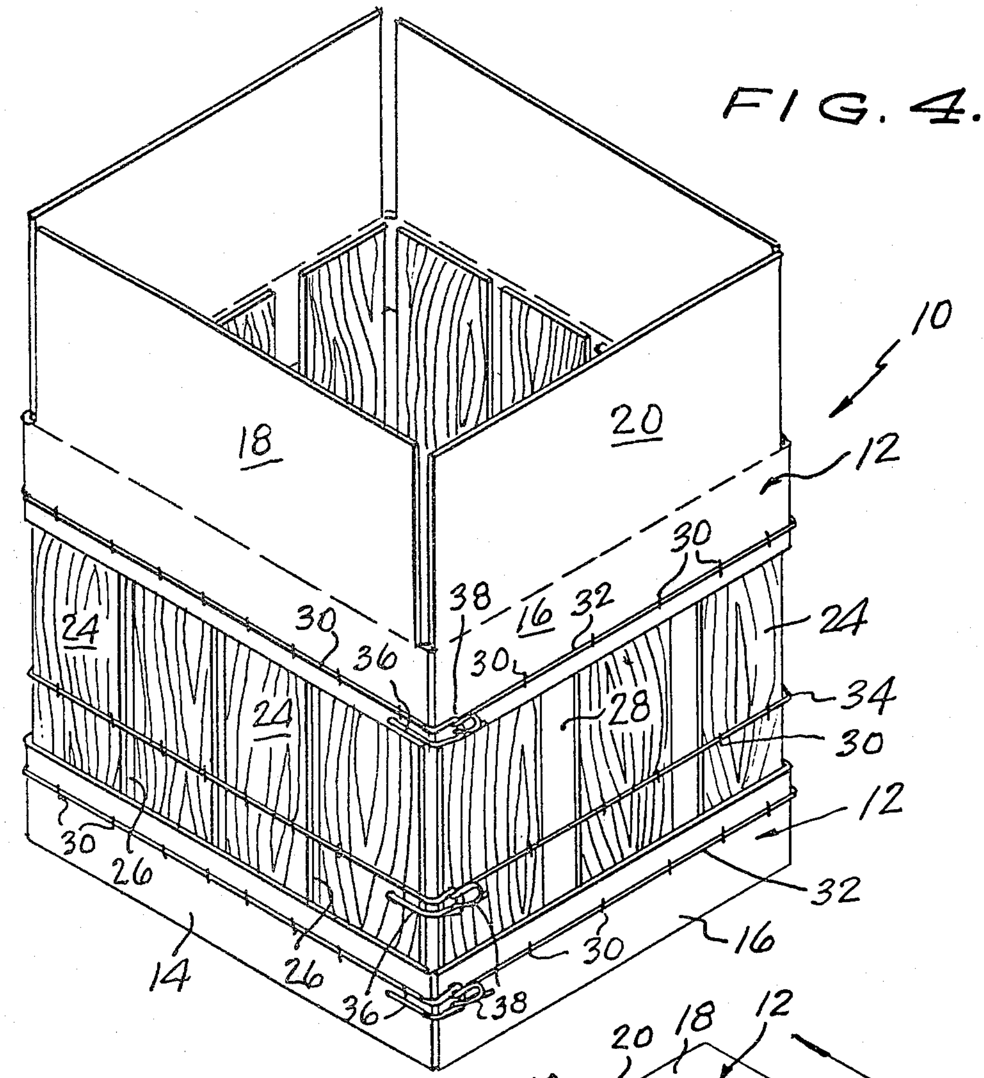
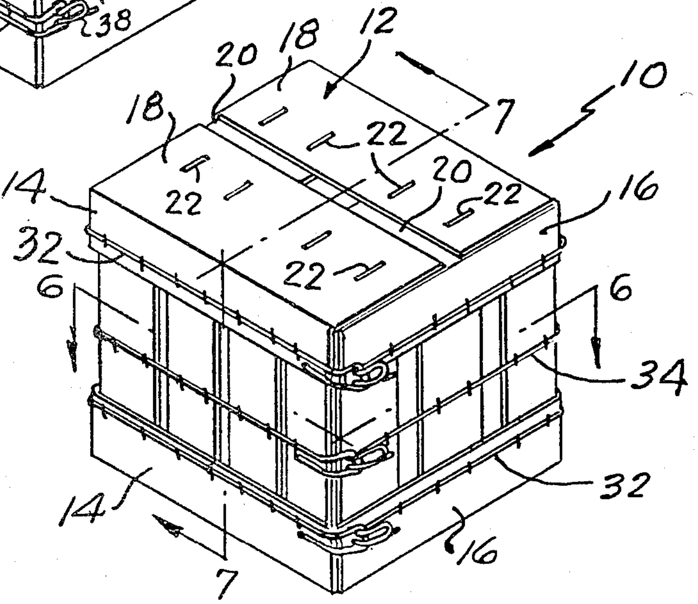
FIG. 5.

METHOD OF MAKING WIRE-BOUND SHIPPING CARTON

This is a division of application Ser. No. 028,700, filed Apr. 10, 1979, now abandoned.

BACKGROUND OF THE INVENTION

1. Field of the Invention

The invention relates to ventilated shipping cartons, and more particularly to ventilated cartons for transporting fruit, vegetables, or the like, which combine spaced, wood veneer slats forming the carton body, with corrugated fibreboard top and bottom closures.

2. Description of the Prior Art

Many fruits and vegetables continue to breath and generate heat after they have been harvested and the continued build-up of heat during shipment has rendered essential the use of strong, ventilated cartons capable of securely holding the produce during long shipments in refrigerated railway cars, or trucks, while permitting flow of cool air to circulate through and about the individual cartons to carry off the generated heat and prevent spoilage.

For many years, slatted wooden crates have been used as a satisfactory means of transport, an early design of which is disclosed in U.S. Pat. No. 488,997 issued to J. W. & A Glidewell in 1893. This crate utilized solid wood end walls, spaced slats running from end to end forming the ventilated remaining walls, and four strengthening and spacing wood cleats upon the side and end walls near each end. Some forty years ago an improved version of this crate came into nearly universal use and involved thinner slats arranged vertically, thinner end walls, the same or greater number of cleats, and a plurality of wires wound horizontally about the side and end walls to bind and strengthen the crate.

Because of the shortage of wood veneer for slats, particularly hard wood which takes so long to grow, and the vastly increased cost, corrugated and wax treated fibreboard cartons have tended to replace wire-bound boxes for many applications during the last twenty years. Examples of ventilated cardboard cartons which have been proposed are disclosed in U.S. Pat. No. 1,767,629 issued to Walter and U.S. Pat. No. 3,863,831 issued to Wozniacki et al. The disadvantages of the cardboard cartons with respect to wire-bound wood crates are reduced stacking strength, perviousness to water and refrigerating chemicals or gases, poorer ventilation and loss of reusage capability.

It has been proposed to use a combination of wood and fibreboard container, as for example disclosed in U.S. Pat. No. 2,293,361 issued to Roberts. The box of this patent comprises a box-like outer fibreboard container, a tubular, inner fibreboard liner, a pair of resilient fibreboard side walls reinforced with wood slats forming inner side walls and a pair of fibreboard, inner end walls encased in wood frames. While the described construction results in a strong, fruit protective box, it is of complex and expensive construction, utilizes a great deal of scarce and expensive wood and provides no ventilation. Another combination wood, cardboard container is revealed in U.S. Pat. No. 3,197,108 issued July 27, 1965 to P. D. Northway. This container comprises a corrugated, slotted cardboard box whose end walls each include a cardboard sheet to which is glued a wood cleat for stacking strength. While this box provides ventilation and improved stacking strength, the strength of the side walls is not comparable to that of the wirebound wood crate.

SUMMARY OF THE INVENTION

The present invention overcomes the defects and disadvantages of conventional shipping boxes as briefly outlined above, by providing a ventilated shipping carton comprising a pair of identical, fibreboard, top and bottom closures each having a four sided rim and a plurality of flaps secured to opposite sides of the rim and movable from an overlapping closed position to an unfolded open, carton loading position, a plurality of veneer slats arranged vertically between the rims of the closures and spaced apart to form the ventilated four sides of the rectangular carton body, and a plurality of spaced, horizontal binding wires wound about and embracing the rims of the top and bottom closures and stapled both to the rims and the ends of the slats. The invention further contemplates a simple method of making the improved carton as including the following steps:

1. forming each closure from a planar fibreboard blank by slitting and scoring to define the rim and flap portions; 2. arranging the wood slats in spaced parallel relation in a horizontal plane;

3. placing the closure blanks on the slats with the rims overlying and touching the ends of the slats and the flaps facing outwardly; 4. placing a wire along each closure rim overlying the rim and the underlying slat ends;

5. stapling the wires to the adjacent rims and underlying slat ends, thereby completing a carton, in flat condition, which may be folded into a box-like structure for loading with fruit or other produce.

From the above it should be noted that a primary object of the invention is to provide a ventilated shipping carton for fruit, or the like, which combines the use of wood, fibreboard and wire materials, overcomes the defects and disadvantages of conventional cartons, while achieving close to the strength and life of a wire-bound wood crate.

A further important object of the invention is to greatly reduce the amount of wood utilized in each carton and thereby overcome the scarcity and high cost of such wood.

Still another important object of the invention is to provide a simple method of fabricating and assembling the carton in flat condition, for shipping, and a simple mode of opening the carton into box-like shape for loading with produce.

Yet a further object of the invention is to provide an improved carton, having the above described characteristics, which is strong and reliable, long lasting, and easy and inexpensive to fabricate and assemble.

The above objects are attained in the improved carton, together with additional advantages over conventional wirebound crates, such as elimination of eight wood cleats per carton, elimination of forty to fifty percent of the veneer including use of thinner slats, reduction of the amount of wire needed, increase of payload during shipping due to omission of cleats from the ends of the crates, ability to print graphics on the fibreboard closures, and ability to utilize self-locking features such as locking flaps in portions of the closures.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will be best understood from the following description of a specific embodiment when read in connection with the accompanying drawings, wherein like reference characters indicate like parts thoughout the several Figures and in which:

FIG. 4 is a perspective view to enlarged scale of the assembled carton of FIG. 2, folded into box-like shape with the bottom closure closed and the top closure open, ready for loading with produce.

FIG. 5 is a reduced perspective view similar to FIG. 4 but with the top closure closed and stapled shut;

DESCRIPTION OF THE PREFERRED EMBODIMENT

Figure 1:
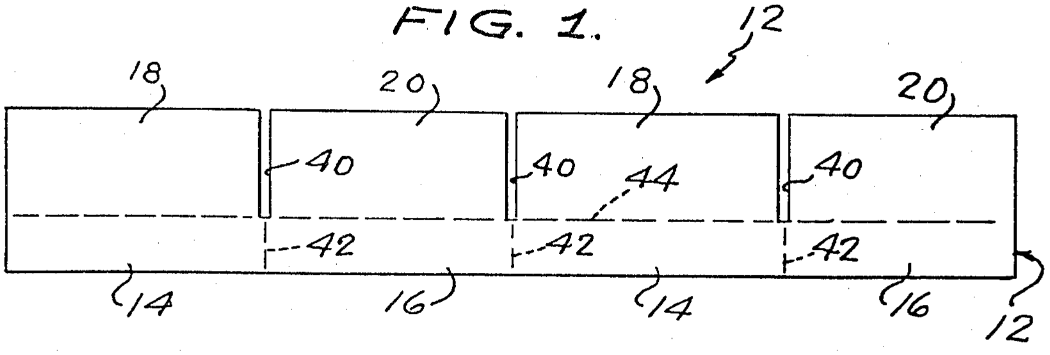
FIG. 1 is a plan view of a fibreboard blank slit and scored for forming the top or bottom closure of an improved carton according to the invention.
Figure 2:
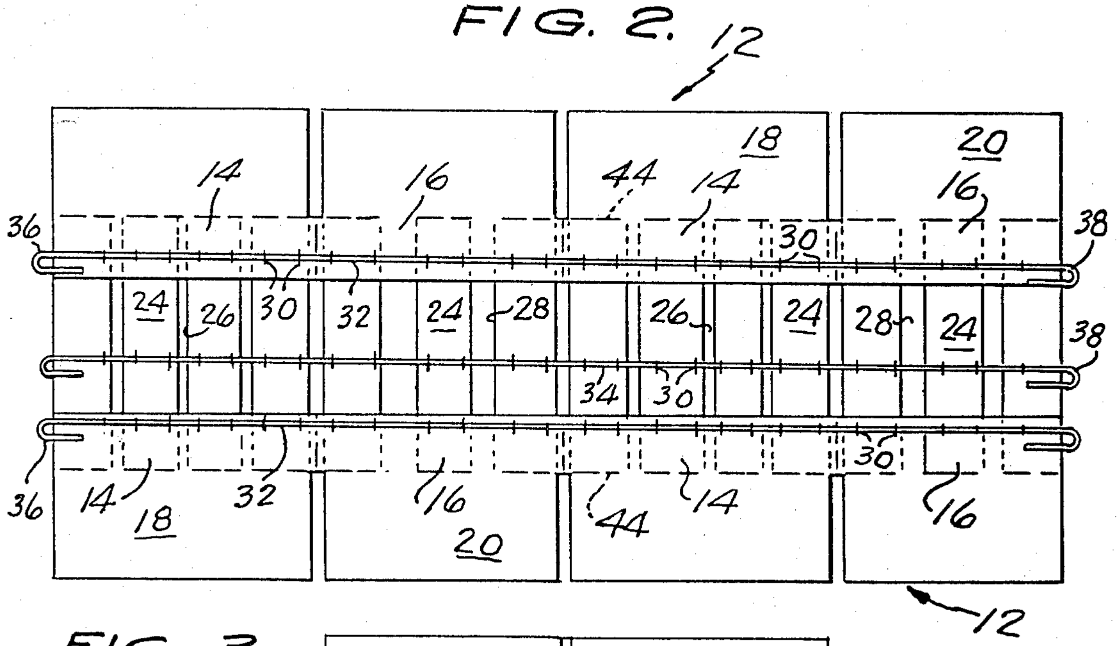
FIG. 2 is a plan view illustrating the method of assembling the top and bottom closures and the veneer slats together with the binding wires for stapling together to form the improved carton in flat condition.

Referring more particularly to the drawings, FIGS. 4 and 5 illustrate an improved wire-bound corrugated box 10 according to the invention, shown respectively in open and closed condition. FIGS. 1 and 2 illustrate steps involved in fabricating the box.

The improved box includes top and bottom closures 12,12 preferably formed of C-flute corrugated, double faced fibreboard havng a Mullen or Cady bursting strength of not less than 200 pounds. The fibreboard is constructed of two kraft facings and a central core sheet of C-corrugations, each facing sheet weighing not less than 42 pounds per 1000 square feet and the corrugated core sheet not less than 33 pounds per 1000 square feet. The facing sheets are firmly glued to the core sheet with a water resistant adhesive. The specified fibreboard is treated conventionally with wax and/or chemicals to provide water and moisture resistant qualities such that when tested by immersion in water for one hour no sample may absorb more than forty percent water. Fibreboard of this quality is suitable for the top and bottom closures as little structural strength is needed to give satisfactory performance as long as the designated strength is maintained by adequate water proofing to withstand transport in refrigerated trucks or railway cars.

Figure 6:
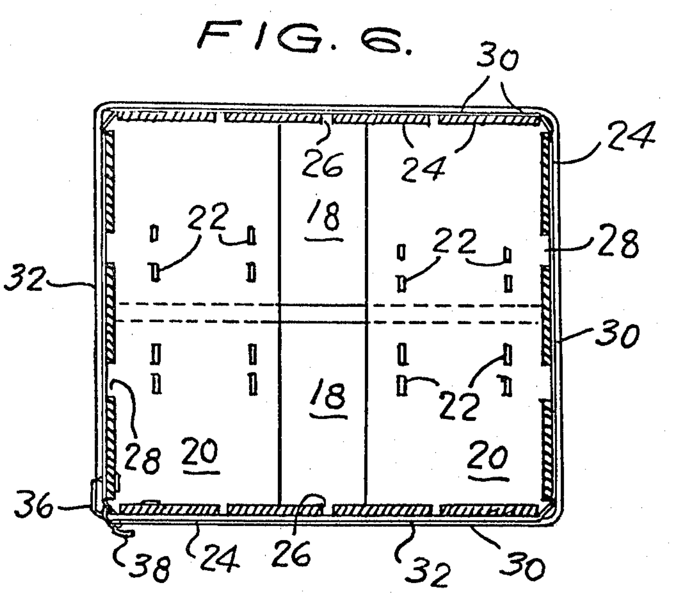
FIG. 6 is an enlarged sectional view taken along line 6—6 of FIG. 5, and looking in the direction of the arrows.
Figure 7:
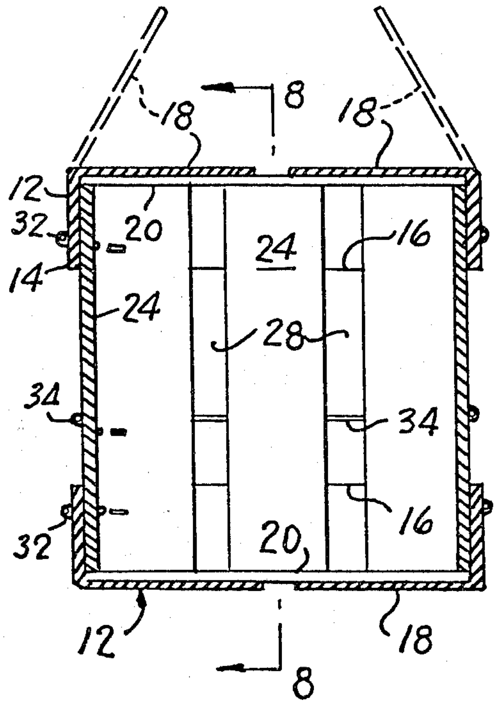
FIG. 7 is an enlarged sectional view taken along line 7—7 of FIG. 5, and looking in the direction of the arrows.
Figure 8:
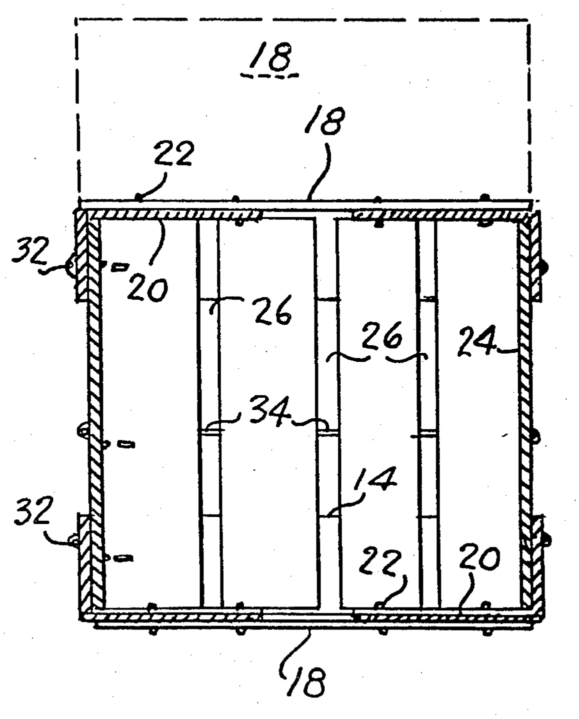
FIG. 8 is a sectional view taken along line 8—8 of FIG. 7, and looking in the direction of the arrows.

Closures 12,12 are identical and include a vertical tubular rim having two pairs of opposed sides 14,14 and 16,16 defining a rectangle. Bendably attached to these sides are the closure flaps 18,18 and 20,20. As apparent from FIGS. 4 and 5 the opposed flaps 20,20 are folded inwardly first and covered by opposed flaps 18,18, all the flaps being then secured by a plurality of staples 22. The bottom closure 12 is closed and secured in the same manner, not visible in FIG. 5 but seen in FIG. 6.

The rectangular body of the improved carton is formed by a plurality of slats 24 preferably formed of hardwood veneer arranged vertically and spaced apart to provide ventilating slots 26, 28, the slots 28 at the narrower side of the carton being preferably slightly wider than slots 26 at the longer side. In the illustrated carton which measures overall approximately 16"×12"×16", the slats 24 are identical and measure approximately 11 and $\frac{7}{8}$ inch height, by 3 and $\frac{3}{4}$ inch width and 1/10 inch thickness. As shown, each opposed longer side 14 of the box includes four slats separated by narrow slots 26 of approximately $\frac{1}{4}$ inch, while the opposed shorter sides 16 each includes three slats 24 separated by wider slots 28 of approximately 5/16 inch. Each slat is secured near its ends by a plurality of staples 30 to the rim sides 14, 16 of the top and bottom closures 12,12. The same staples also secure a pair of horizontal binding wires 32,32 to the rims of the closures 12,12. For added reinforcement strength a third binding wire 34 is placed to surround the periphery of the carton near the centers of the slats 24 and this wire is secured only to the slats by a plurality of staples 30. Each binding wire 32, 34 terminates at its ends in oppositely directed loops 36,38 which are engaged to hold the carton in its box shape.

The wood slats 24 provide the vertical strength needed in the four side walls of the carton. The wood holds up when wet and under stress of load stacking of cartons for transport. It should be noted that the slats are secured to the inside faces of the closure rims and thus when cartons are loaded side by side, ventilation channels along the carton sides exist as defined by the thickness of the rims, and these channels communicate with the ventilating slots 26, 28. Further the wood slats are resilient and will bulge slightly under expansion forces of produce inside the carton so as to avoid harm to the produce. While hardwood is preferred as the material of the slats, soft wood, plastic or metal may be used. The binding wires 32, 34 may be of steel or galvanized iron, single or twisted strand, and may be replaced by metal or plastic bands. The staples 30 for securing the wires, slats and closure rims may be replaced by other types of fasteners, or by adhesives, glues, or the like. Also staples 22 may be replaced by glue or by self-locking flaps.

The preferred method of fabricating the described carton comprises the following steps:

1. The top and bottom closures 12 are each stamped as an elongated rectangle pictured in FIG. 1 from three ply fibreboard described above on standard carton making machines. Simultaneously, the three transverse slits 40 delineating flaps 18 and 20 and the score, or fold lines, 42 prolonging the slits to completely transverse the unitary flat blank 12 and longitudinal score line 44 are formed to define the corner folds between and the rim sides 14 and 16 completing the blank pictured in FIG. 1.

2. The wood slats 24 are next arranged parallel and aligned on a table or other support surface, and are suitably spaced as at 26, 28 to define the ventilating slots of the carton, see FIG. 2.

3. A pair of closures 12,12 are then laid on the slats 24 with the slat ends aligned with rim fold lines 44,44 and the flap portions 18, 20 facing outwardly away from each other.

4. A pair of bind wires 32,32 is placed along the blanks 12,12 covering the rim portions 14, 16 and with their loop ends 36, 38 protruding slightly beyond the last slats. A third binding wire 34 may be laid parallel to wires 32 across the center portions of the slats 24.

5. The wires 32,32,34 are then stapled at 30 in a plurality of locations to the rim sides 14, 16 and underlying slats 24, each staple embracing the wire and passing through both the rim and a slat.

The above steps complete the carton in flat condition as pictured in FIG. 2 and in which condition a stack of flat cartons may be conveniently shipped to a user.

Figure 3:
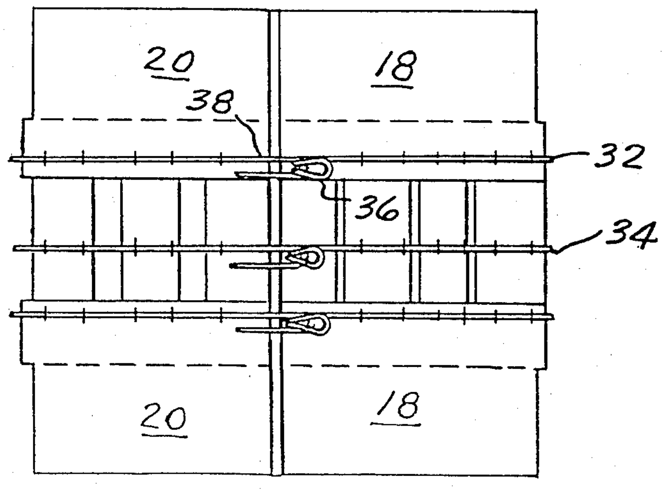
FIG. 3 is a plan view of the assembled carton of FIG. 2, folded double for more convenient shipping to a box loading destination.

Alternative shipping condition is illustrated in FIG. 3 in which the flat carton is folded to lie in double planes by merely turning the end panels 18, 24, 18 and 20, 24, 20 to overlie the two central panels, a flat carton of reduced area and double thickness resulting and being held in this condition by inserting loops 36 through loops 38 and bending loops 36 back about 180 degrees.

The carton fabrication as described above may be performed automatically with standard stapling machines by feeding the slats, closures, and wires, appropriately arranged as in FIG. 2, into the machines.

Once the cartons have been shipped to a user, they can be easily unfolded, from their flat condition of either FIG. 2 or FIG. 3, into the box shape of FIG. 4, by merely opening into tubular, rectangular shape. The bottom closure flaps 20 are then folded inwardly followed by bottom flaps 18 and secured together by staples, or other fastening means. It should be noted that during shaping of the box into a rectangle, the outside edges of the end panels 18 and 20 and the end slats 24 come into abutting or nearly abutting relation to form a corner of the box and the box is secured against spreading while being loaded by interengagement of the wire loop ends 36, 38. The unfolded carton as pictured in FIG. 4 is ready to be loaded with fruit, or other produce, and afterward the top flaps 20 and 18 are then folded and secured as shown in FIG. 5.

The described carton of the invention enables the use of thinner and fewer slats so that approximately fifty percent of the veneer is used as compared to a conventional wire-bound wood crate. In addition, all of the cleats are eliminated. Thus through saving of scarce wood material there is roughly a twenty percent saving in cost of manufacture. Yet the new carton compares favorably in strength and life to the conventional crate.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. The method of making a shipping carton for fruits, vegetables, and the like, comprising the steps of:

a. forming substantially identical top and bottom closure members from a pair of planar blanks, each blank having fold lines to define four sides of a rectangular, tubular rim, and slits defining flaps foldable to overlie one another and close one side of the rim;
b. arranging a plurality of slats in spaced parallel relation to one plane;
c. placing the closure member blanks in flat unfolded condition with their rim portions covering the ends of the slats and their flap portions disposed outwardly away from each other;
d. placing an elongated binding element along each rim portion covering the rim and the underlying slat ends; and
e. fastening the binding elements to the adjacent rim and slat ends, thereby completing the carton in flat condition ready for shipment to a packing destination where the carton may be folded into a box-like structure.

2. The method of making a shipping carton according to claim 1, wherein the closures of step (a) are formed of fibreboard, the slats of step (b) are formed of wood veneer, the elongated binding elements of step (d) are formed as wires, and metal staples are used in step (e) to fasten the wires, slats and closure rims together.

3. The method of making a shipping carton according to claim 2, wherein a third wire is placed parallel to and between the two wires of step (d) and over the center portions of the slats, said third wire in step (e) also being fastened to the slats by staples.

4. The method of making a shipping carton according to claim 3, wherein each end of each wire is formed as a loop member, and wherein after securement into a flat assembly of closures, slats and wires, said assembly is folded into a box-like structure and held therein by interengagement of the loop members.

* * * * *